Dec. 17, 1957  R. CREVELING  2,817,019
SHOCK-EXCITED OSCILLATOR
Filed Dec. 1, 1955  3 Sheets-Sheet 1

INVENTOR:
Robert Creveling
BY
Attorney

INVENTOR:
Robert Creveling
BY

*Roland A. Anderson*
Attorney

United States Patent Office 2,817,019
Patented Dec. 17, 1957

2,817,019

SHOCK-EXCITED OSCILLATOR

Robert Creveling, Albuquerque, N. Mex., assignor, by mesne assignments, to the United States of America as represented by the United States Atomic Energy Commission Application December 1, 1955, Serial No. 550,506

7 Claims. (Cl. 250—36)

This invention relates broadly to oscillator circuits and more particularly to a shock-excited, instant starting quartz crystal oscillator.

Precision time measurements play an important part in the electronic and radar fields. These time measurements implied are in the range of microseconds and therefore require electronic means of measuring. This is accomplished by generating a sinusoidal wave form of a known frequency and counting the cycles between events. The sinusoidal wave forms may be shaped into pulses having predetermined time intervals, and these pulses are counted between events which give a measure of time. In radar, it is known that pulses of a known frequency are transmitted against a target and the pulses are reflected off of the target back to the transmitter where they are received. The length of time it takes a pulse to leave and return will give a measure of the distance between the transmitter and the target. From the foregoing, it can be seen that the precision of the sinusoidal wave form or the pulses is of great importance. Further, it can be seen that the sinusoidal wave form or pulses must start and stop precisely with the beginning and end of the event. It is the generating and instant starting and stopping of the sinusoidal wave form that this invention is concerned with.

There are of course prior art oscillators that will generate a sinusoidal wave form and also there are means for converting the sinusoidal wave forms to pulses.

There are also shock-excited oscillators which employ a vacuum tube that may be used as a switch to interrupt a steady flow of anode current through a resonant L-C tank circuit as the means of exciting oscillations in the tank circuit. The control grid is held slightly positive, thus, the tube is normally conducting practically at saturation anode current. It is in series with the L-C tank circuit; therefore, the steady current flows through the inductor L, since the L-C circuit is in the cathode circuit. By applying suddenly a large negative voltage to the control grid of the switch tube, the tube is cut off and the resonant tank circuit is shocked into oscillation. This type of shock-excited oscillator has some important limitations. As stated above, the oscillator employs an L-C tank circuit and this means that fluctuation in temperature will affect the period of oscillation. Further, due to the inductance, the current cannot stop instantaneously. This is due to the energy stored in the magnetic field which cannot be dissipated instantaneously.

The oscillator of this invention is of the shock-excited type that employs a quartz crystal as the oscillator frequency and is made to start and stop precisely with the beginning and end of an event.

The successful operation of the oscillator depends on having a certain admittance presented at time zero. The admittance referred to is a measure of how readily alternating current will flow in a circuit. By employing a crystal that is deformed by prestressing with a suitable voltage and then the crystal released, it will have an admittance associated with the resultant vibration amplitude. It should be noted that any change in a charge across the crystal will result in this action. This, in effect, will permit the crystal to present a suitable impedance at time zero and avoid the delay brought about if the crystal is at rest. A good example of prestressing the crystal and releasing it, is a pendulum that is pulled from rest to its maximum, then quickly released. It can be seen from this example that the pendulum will instantly start swinging at a frequency of oscillation at the instant it is released. The ability to electrically prestress the crystal gives the shock-excited oscillator the stability of a crystal. There are means of mechanically prestressing a crystal, but it is obvious that the crystal could not be made to instantly oscillate by mechanical means at the instant of an electronic trigger pulse.

One of the objects of the present invention is to provide a shock-excited oscillator that has the stability of a crystal.

Another object of this invention is to provide a shock-excited oscillator wherein a crystal is electrically prestressed so that it instantly starts oscillating when triggered by an electrical pulse.

A further object of this invention is to provide a shock-excited oscillator capable of instantly starting and stopping with the beginning and end of an event and incorporating the timing accuracy associated with a quartz crystal.

Another object of the present invention is to provide a shock-excited oscillator having an electrically prestressed crystal that permits the crystal to present a suitable impedance at time zero and avoid the delay brought about if the crystal is initially unstressed.

Other objects and advantages of the present invention will be apparent from the following specification taken in connection with the drawings made a part hereof, and the description of a presently preferred embodiment.

Before discussing the circuit of the invention, it might be well to review briefly the properties of a quartz crystal and the direct relation between the electrical and mechanical quantities.

The piezoelectric relations of the mechanical deformations to the charges on the various faces are rather complicated and these relations change for the various crystal cut orientations. The modes of vibrations are quite varied. Waves travel between the various faces at velocities which are associated with the surface waves as well as the longitudinal and transverse waves. The various waves may generate the other forms of waves at interfaces such as mounting plates, etc. In addition to the various fundamental vibrations in the different directions, there are harmonics (overtones) and various flexures and shear vibrations. These vibrations are also related to the crystal cut.

The piezoelectric effect in a quartz crystal is called electrostriction. This is a reversible process and deals with the separation of electric charges as the result of mechanical stress, thus producing an electric field, or the production of mechanical strain when an electric field is applied. The electrical response of a vibrating crystal may be simulated by replacing the crystal with an electrical network of the type shown in Fig. 1.

Figure 1:
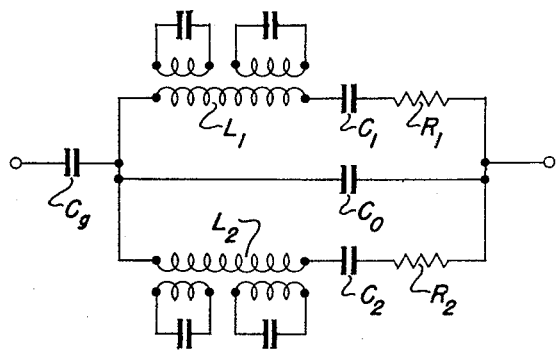
Fig. 1 is an equivalent circuit diagram of a vibrating crystal that has been shocked electrically or mechanically.

Referring now to Fig. 1, the condenser $C_0$ represents the electrostatic capacity between the crystal electrodes when the crystal is in place and not vibrating. The condenser $C_g$ represents the capacity of the air gap between the electrodes and the crystal. The series L, C and R represent the equivalent mass, compliance, and friction loss of the vibrating crystal respectively for two different modes. The additional inductance and capacity circuits indicate the possibility of interaction by other modes of vibration.

Generally, a crystal has only two electrodes and the physical dimensions are made to produce a desired dominant mode. Thus, in the simplest form, the electrical equivalent circuit may be reduced to that shown in Fig. 2. This corresponds to the equivalent circuit generally used. It applies quite well for crystals used in normal fashions such as the controlling elements for free-running oscillators.

Figure 2:
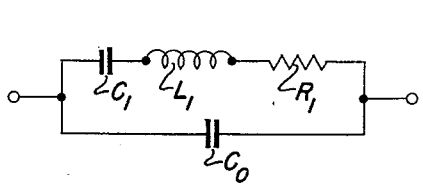
Fig. 2 is an electrical equivalent circuit diagram in the simplest form of a crystal.
Figure 3:
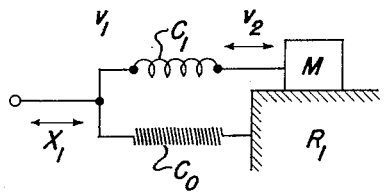
Fig. 3 is a diagram of the mechanical analog of the equivalent circuit of Figure 2.

Referring to Fig. 3, there is shown a mechanical analogue of the electrical circuit of Fig. 2. For the direct relation between the mechanical and electrical quantities, refer to the table below:

| Quantity | |
| --- | --- |
| Mechanical | Electrical |
| Force, F | E, Electromotive force |
| Displacement, X | Q, Charge |
| Velocity, $v$ | $i$, Current |
| Mass, M | L, Inductance |
| Compliance, C | C, Capacitance |
| Resistance, R | R, Resistance |
| Energy: | |
| $\frac{1}{2}Mv^2$ | $\frac{1}{2}Li^2$ Stored |
| $\frac{1}{2}\frac{X^2}{C}=\frac{1}{2}CF^2$ | $\frac{1}{2}\frac{Q^2}{C}=\frac{1}{2}CE^2$ |
| $Rv^2$ | $Ri^2$ Dissipated |

Figure 4:
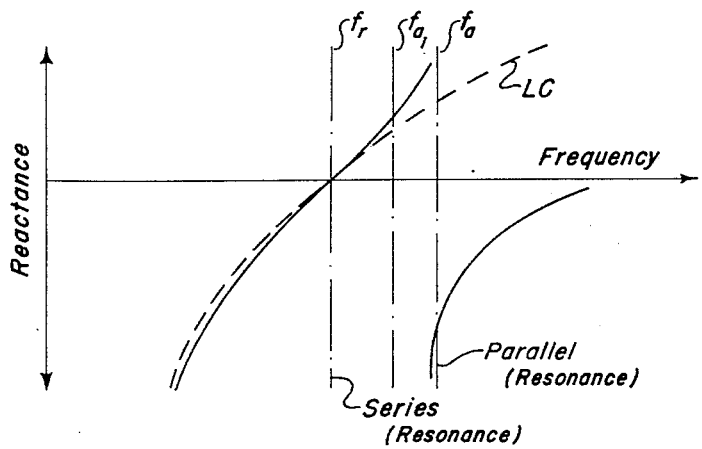
Fig. 4 is a set of curves illustrating the reactance vs. frequency for either the electrical equivalent circuit of Figure 2 or the mechanical analog of Figure 3.

After energy is stored in the system the reactance vs. frequency curves for either the electrical circuit or the mechanical analogy is shown in Fig. 4. For steady state conditions the reactance is zero at the series resonant frequency.

$$f_r = \left(\frac{1}{2\pi\sqrt{L_1C_1}}\right)$$

determined by the LCR circuit. As the frequency is increased, this branch becomes inductive; when the inductive reactance becomes equal to the capacitive reactance of the condenser $C_0$, then parallel or anti-resonance will occur and the circuit offers a very high impedance. The frequency corresponding to this mode of operation is indicated by $f_a$. If an additional condenser is shunted across $C_0$, the anti-resonant frequency will decrease (toward $f_r$) as shown by $f_{a_1}$. The frequencies indicated in the curves of Fig. 4 are spread out for clarity; actually, they are very nearly the same.

Under transient conditions, the impedance of a crystal is changing as the vibrations in the crystal are built up in accordance with the equation:

$$Y(t) = \frac{1}{R}\left(1 - e^{-\frac{Rt}{2L}}\right)$$

where $Y(t)$ is the admittance as a function of time $t$ in seconds. If an alternating voltage with a frequency which corresponds to the circuit's resonant frequency is suddenly applied to the circuit, the admittance will increase exponentially starting from zero at the time the voltage is applied. The operation of the circuit of this invention does not depend on the admittance of the mounting capacitance for operation so that the equivalent circuit for the quartz crystal shown in Fig. 2 reduces to the simple series resonant circuit shown in Fig. 5.

The differential equation governing current flow in a series resonant circuit may be expressed as $$L\frac{di}{dt} + Ri + \frac{\int i\,dt}{C} = E \sin \omega t$$

We can find an explicit expression for $i$ as a function of time, using the Laplace transform method, assuming initial conditions are quiescent, i. e., $i_0=0$, $Q_0=0$. At resonance this expression may be written $$i(t) = E \sin \omega t \left[\frac{1}{R}\left(1 - e^{-\frac{Rt}{2L}}\right)\right]$$

From this equation, we may obtain by transposing terms the expression for $Y(t)$ the transient admittance given above. (The general solution of this problem is set forth on pages 80 to 83 of Golman's "Transformation Calculus and Electrical Transients," published by Prentice-Hall, Inc., 1949.)

If a crystal is at rest and an alternating voltage of frequency $f$ near resonance is applied, the admittance will be low at first. It will be made up almost entirely of the susceptance $2\pi f C_0$ of the condenser $C_0$ of Fig. 2 or reciprocal of the "stiffness" of the spring $C_0$ of Fig. 3. As the vibration in the crystal is built up, then the admittance will build up exponentially in accordance with the net energy stored each cycle with due allowance for the Q of the system. In the mechanical analogy, one may think of the force exerted by the mass M, acting through spring C, of stiffness K as increasing with an increase in amplitude of vibration and applied out of phase with the impressed force. The impedance presented to the impressed force will thus decrease as the oscillation of the mass M increases until it is low enough to be useful, as will be pointed out later. Eventually, the impedance becomes extremely low and one may think of the impressed force as being applied against an equal and opposite force (reaction of mass M) and for all intents and purposes, it will be acting against an immovable pin. Under these conditions, the impedance is zero or the admittance is infinite. The same thing takes place in the electrical circuit.

The successful operation of the circuit of this invention depends on having a certain minimum admittance presented at time zero. It has been shown that the crystal has very small admittance when it is at rest. In order to bridge the gap and not have to wait for the admittance to build up to a necessary value, the crystal should be prestressed by the application of an appropriate voltage across the crystal. It can be seen that it is necessary to dissipate the charge in the mounting capacitance suddenly and at the same time allow the crystal to start vibrating. It will thus present an associated admittance to a forcing voltage and be of proper phase and frequency.

Figure 6:
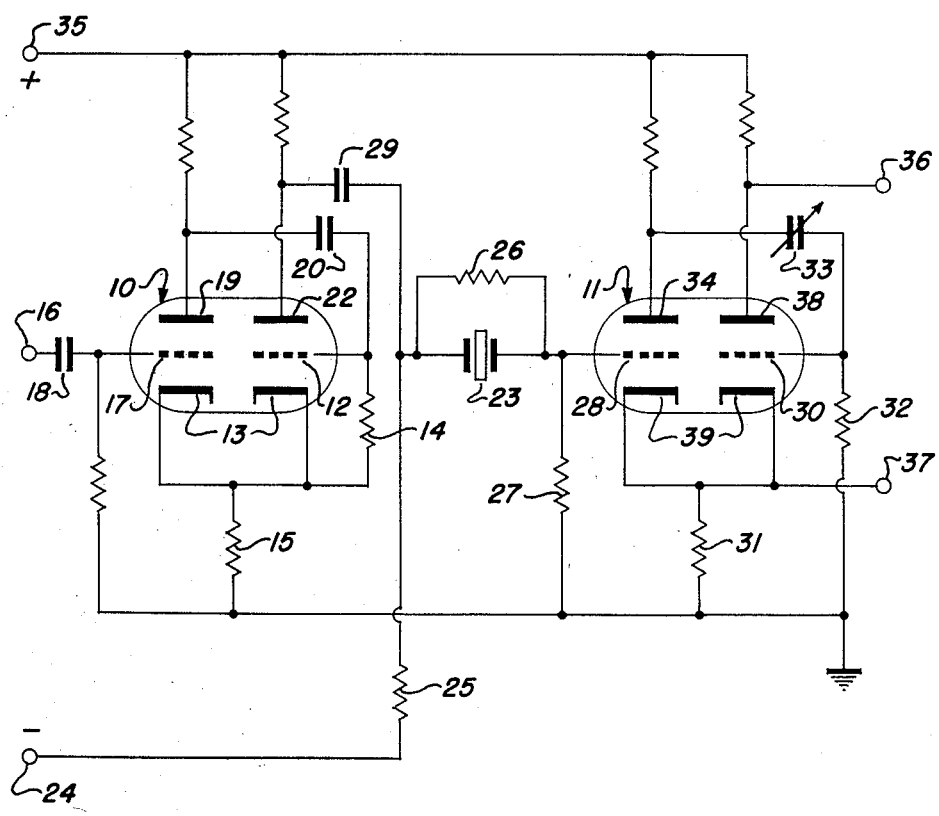
Fig. 6 is a circuit diagram of a shock-excited oscillator provided with means for triggering an electrically prestressed crystal into oscillation.

Referring now to Fig. 6, the circuit employs two double triodes 10 and 11, and they are connected essentially the same as in multivibrator type circuits. More particularly, tube 10 acts as a "one-shot" monostable multivibrator and is employed to produce a positive voltage pedestal of a definite time duration, which is, of course, established by the circuit elements. Tube 10 is essentially a two-stage resistance-capacitance coupled amplifier with one tube cut off and the other normally conducting. By the arrangement for biasing the tube, the balanced condition of the circuit is established. The control grid 12 of tube 10 is connected to its cathode 13 through a resistor 14. No current normally flows through resistor 14; therefore, the grid bias is normally zero. The anode current of the right side of tube 10 flows through the cathode resistor 15, and the resultant voltage drop across the resistor 15 biases the left side of tube 10 to cut-off. When the right side of tube 10 is not conducting, the left side cannot be cut off by the self-bias developed across the cathode resistor 15. In operation, the left side of tube 10 is cut off initially by the voltage drop produced across cathode resistor 15 by the anode current of the right side of the tube. The right side is conducting heavily because its grid is at the cathode potential. When a positive pulse is applied to input terminal 16, and, in turn, is impressed on the control grid 17 through capacitor 18, the left side of tube 10 begins to conduct and the voltage at its anode 19 decreases. This decrease is transmitted through capacitor 20 to be impressed on control grid 12 as a negative voltage. As the negative voltage on control grid 12 decreases, the voltage drop across the cathode resistor 15 decreases, allowing more current to flow in the left side of the tube. The voltage of anode 19 is still further decreased, which decreases that of control grid 12 further and as a result, a large positive voltage pulse is produced at anode 22.

Before the positive voltage pulse from anode 22 is applied, a crystal 23 is prestressed by having a charge on it from a negative voltage source connected to terminal 24. Also, by the arrangement of series resistors 25, 26 and 27, connected between the negative voltage source and ground, control grid 28 of tube 11 is biased negatively. This, of course, biases the left side of tube 11 to cut-off. The positive voltage pulse from anode 22 is impressed on the crystal 23 through capacitor 29 to take off the charge on the crystal, which allows it to control the frequency of oscillation.

Further, this voltage pulse from anode 22 is applied to the control grid 28 and is sufficient to raise it to where the left side of the tube will conduct and start oscillating. Tube 11 is essentially a cathode-coupled oscillator and similar to the circuit of tube 10, except control grid 30 of tube 11 is returned to ground through a resistor 32, while control grid 12 of tube 10 is returned to its cathode through resistor 14. Also, there is a suitable amount of feedback supplied through a variable capacitor 33, which is connected between anode 34 and control grid 30. The time constant of capacitor 33 and associated control grid resistance 32 is such that the oscillator will oscillate at the desired frequency. This time constant encourages only the desired mode of oscillation in the controlling crystal 23.

In each of the tubes, the anodes have their separate anode resistors that are connected to a direct current supply which is connected to terminal 35.

An output signal can be taken from either terminal 36 or 37 depending upon the impedance desired. Terminal 36 is connected to anode 38 of tube 11 for the high impedance output, while terminal 37 is connected to cathodes 39 for low impedance output. The cathodes are returned to ground through cathode resistor 31.

Figure 5:
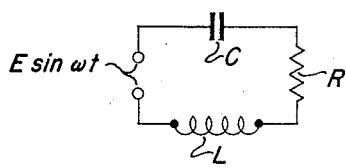
Fig. 5 is an equivalent circuit diagram of a crystal in a series resonance circuit as employed in the shock-excited oscillator of this invention.
Figure 7:
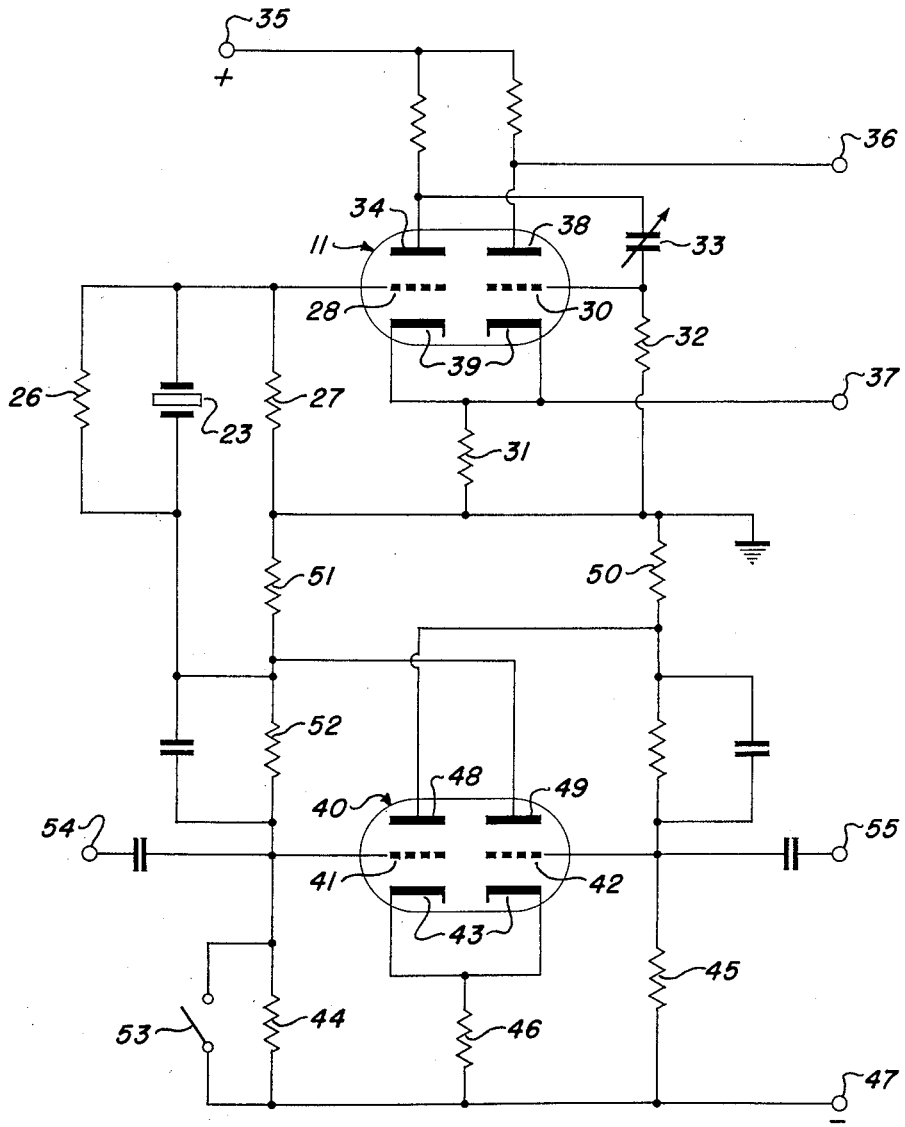
Fig. 7 is a circuit diagram of a shock-excited oscillator with means of triggering the oscillator on and off at specified time intervals.

Referring to Fig. 7, there is shown another application of the circuit of Fig. 5 in which a flip-flop circuit is employed to start and stop the crystal oscillator at predetermined time intervals. The circuit comprises essentially the crystal 23 and the cathode-coupled oscillator circuit of tube 11 that were described in Fig. 5, and a flip-flop circuit to be described below. In this flip-flop circuit, tube 40 has its control grids 41 and 42 and the cathodes 43 connected through their respective resistors 44, 45 and 46 to negative voltage source connected to terminal 47. The anodes 48 and 49 are connected through their respective resistors 50 and 51 to ground. The circuit is connected in this manner to prestress the crystal 23 by charging it negatively. This is accomplished by the voltage dividing network connected between the negative supply and ground. The dividing network comprises resistors 44, 52, 26 and 27. Either the left or right side of the flip-flop circuit may conduct when the circuit is first turned on, so a switch 53 is employed to insure that the left side of the tube is cut off. This is necessary, since a positive start pulse is applied to terminal 54, which is, in turn, applied to the control grid 41. This positive pulse flips the flip-flop circuit from a nonconducting left side of the tube to conducting and the conducting right side to nonconducting. When this happens, a large positive pulse is produced at the anode 49 that is applied across the crystal 23 and the control grid 28 of tube 11 to discharge the crystal 23 and instantly shock excite the cathode-coupled oscillator tube 11 into oscillation. As stated above, the positive pulse applied to the crystal, that was formerly prestressed by a negative voltage, takes the charge off of the crystal and shocks the oscillator into oscillation at the frequency of the crystal. The oscillator continues to oscillate until a positive stop pulse is applied to terminal 55, which is, in turn, applied to control grid 42. Since the right side is nonconducting as a result of the start pulse, the flip-flop circuit flips back to its original state and produces a large negative pulse at anode 49, which is applied to the crystal 23 and control grid 28 of tube 11 to instantly stop the oscillations.

There thus has been disclosed an instant starting crystal-controlled oscillator. The oscillator can be arranged to provide time markers for radar or a means of measuring precisely the time interval between two pulses. Many variations in the arrangement of the system or in the network described will now be apparent to one skilled in the art without departing from the sphere and scope of the invention as defined in the appended claims.

What is claimed is:

1. A shock-excited oscillator comprising a quartz crystal, a resistance-capacitance oscillator tuned to the crystal frequency, a source of potential, means for applying the potential across the crystal for electrically prestressing the crystal, and trigger means electrically connected to the crystal for discharging the crystal into instant oscillation.

2. A shock-excited oscillator as in claim 1, wherein the oscillator includes a resistance-capacitance network tuned to the crystal frequency.

3. A shock-excited oscillator as in claim 2, wherein the oscillator comprises a double-triode thermionic tube which is connected as a cathode-coupled oscillator.

4. A shock-excited oscillator as in claim 3, wherein each triode of the double triode thermionic tube has a cathode, a grid and an anode, the cathodes being connected together to provide a feedback circuit, and a resistance-capacitance network tuned to the crystal frequency having the capacity connected between the anode of the first triode of the tube and the grid of the second triode of the tube, and the resistance connected between the grid of the second triode of the tube and ground.

5. A shock-excited oscillator as in claim 4, wherein the monostable multivibrator includes a double triode thermionic tube of which each triode has a cathode, a grid and an anode, each cathode being connected through a resistance to ground, an input circuit connected to the grid of the first triode of the tube for accepting a trigger pulse, a capacitor connected between the anode of the first triode of the tube and the grid of the second triode of the tube, a resistor connected between grid of the second triode of the tube and the cathodes of the tube, and a coupling capacitor connected between the anode of the second triode of the tube and the crystal for transmitting therethrough a discharging pulse to the crystal when the input circuit accepts a trigger pulse.

6. A shock-excited oscillator comprising a quartz crystal, a resistance-capacitance oscillator tuned to the crystal frequency, a source of potential, means for applying the potential across the crystal for electrically prestressing the crystal, and a monostable multivibrator circuit including an input circuit adapted to receive a trigger pulse and an output circuit connected across the crystal for transmitting a discharging pulse to the crystal when the input circuit receives a trigger pulse.

7. A shock-excited oscillator comprising a quartz crystal, a resistance-capacitance oscillator tuned to the crystal frequency, means electrically connecting the crystal to the oscillator, a source of negative voltage, a flip-flop circuit including a double triode thermionic tube of which each triode has a cathode, an anode and a grid, the grids being biased negatively by a connection from the grids through respective resistances to the negative voltage source, a first resistance-capacitance parallel network connected between the grid of the first triode of the tube and the anode of the second triode of the tube, a second resistance-capacitance parallel network connected between the grid of the second triode of the tube and the anode of the first tube, the anodes being connected to ground through their respective resistors, the crystal being connected to the anode of the second triode of the tube and being charged negatively for electrically prestressing the crystal, a first input circuit connected to the grid of the first triode of the tube and adapted to receive a start pulse for triggering the flip-flop circuit to discharge the crystal into oscillation, and a second input circuit connected to the grid of the second triode of the tube and adapted to receive a stop pulse for triggering the flip-flop circuit to disable the resistance-capacitance oscillator.

References Cited in the file of this patent

UNITED STATES PATENTS 2,269,417    Crosby                Jan. 6, 1942

FOREIGN PATENTS 569,339    Great Britain          May 18, 1945

U. S. DEPARTMENT OF COMMERCE
PATENT OFFICE

CERTIFICATE OF CORRECTION

Patent No. 2,817,019            December 17, 1957

Robert Creveling

It is hereby certified that error appears in the printed specification of the above numbered patent requiring correction and that the said Letters Patent should read as corrected below.

Column 6, line 50, for the claim reference numeral "4" read --6--.

Signed and sealed this 22nd day of April 1958.

(SEAL)
Attest:

KARL H. AXLINE

Attesting Officer

ROBERT C. WATSON
Commissioner of Patents